United States Patent
Longcor, IV

(10) Patent No.: US 7,900,266 B1
(45) Date of Patent: Mar. 1, 2011

(54) ASPHALTIC ROOFING SHINGLE WITH SELF SEAL ADHESIVE COMPOSITION

(75) Inventor: William K. Longcor, IV, Stillwater, NJ (US)

(73) Assignee: Building Materials Investment Corporation, Dallas, TX (US)

( * ) Notice: Subject to any disclaimer, the term of this patent is extended or adjusted under 35 U.S.C. 154(b) by 937 days.

(21) Appl. No.: 11/640,689

(22) Filed: Dec. 18, 2006

Related U.S. Application Data

(60) Provisional application No. 60/751,525, filed on Dec. 19, 2005.

(51) Int. Cl.
*C10C 3/00* (2006.01)
(52) U.S. Cl. .............. 106/279; 156/60; 52/420
(58) Field of Classification Search ........... 106/279; 156/60; D25/139; 52/420
See application file for complete search history.

(56) References Cited

U.S. PATENT DOCUMENTS

| | | | | |
|---|---|---|---|---|
| 3,138,897 A | * | 6/1964 | McCorkle | 52/420 |
| 3,434,259 A | * | 3/1969 | Corbin | 52/420 |
| 3,919,072 A | * | 11/1975 | Pitchford et al. | 208/4 |
| 4,405,680 A | * | 9/1983 | Hansen | 442/180 |
| 5,382,449 A | * | 1/1995 | Hedges | 427/187 |
| 5,615,523 A | * | 4/1997 | Wells et al. | 52/98 |
| 6,258,255 B1 | * | 7/2001 | Gale et al. | 208/44 |
| 6,696,125 B2 | | 2/2004 | Zanchetta et al. | 428/40.1 |
| 6,753,362 B2 | | 6/2004 | Khan et al. | 524/62 |
| 6,813,866 B2 | | 11/2004 | Naipawer, III | 52/518 |
| 6,895,724 B2 | | 5/2005 | Naipawer, III | 52/48.1 |
| 6,936,329 B2 | | 8/2005 | Kiik et al. | 428/141 |
| 2002/0124775 A1 | * | 9/2002 | Hemmings et al. | 106/273.1 |
| 2003/0024857 A1 | * | 2/2003 | Ackerson et al. | 208/314 |

* cited by examiner

*Primary Examiner* — Jennifer K Michener
*Assistant Examiner* — Carlos Barcena
(74) *Attorney, Agent, or Firm* — William J. Davis; Alvin T. Rockhill

(57) ABSTRACT

It has been unexpectedly found that the solvent extracted aromatic cut of heavy vacuum gas oil can be oxidized to produce an adhesive composition that has all the needed attributes of a self seal adhesive for asphalt roofing shingles. This adhesive composition does not require any volatile organic solvents and is accordingly environmentally friendly. It does not contain any asphalt or polymers and will not phase separate. Thus, it offers excellent long term stability. Additionally, it is made by the simple oxidation of the solvent extracted aromatic cut of heavy vacuum gas oil and is accordingly relatively inexpensive. The subject invention more specifically reveals an asphaltic roofing shingle comprising a back surface and an exposure surface, wherein the back surface is covered with an oxidized solvent extracted aromatic cut of heavy vacuum gas oil.

20 Claims, No Drawings

ASPHALTIC ROOFING SHINGLE WITH SELF SEAL ADHESIVE COMPOSITION

This application claims benefit of U.S. Provisional Patent Application Ser. No. 60/751,525, filed on Dec. 19, 2005. The teachings of U.S. Provisional Patent Application Ser. No. 60/751,525 are incorporated herein by reference in their entirety.

BACKGROUND OF THE INVENTION

Adhesives are utilized in a wide array of applications including packaging, in manufacturing consumer and industrial products, and in household applications. The type of adhesive needed is dependent upon the requirements of the application and the substrates to which it will be applied. Accordingly, countless different types of adhesive compositions have been developed to meet the demands of the applications in which they will be used. It is, of course, critical to select an adhesive that meets all of the physical and chemical requirements of a given application.

Adhesives are sometimes applied to roofing shingles to secure them to the roof structure to which they are being applied. The adhesive can be the sole means for affixing the roofing shingles to the structure or the adhesive can be used in conjunction with roofing nails or other mechanical means for affixing the shingles to the substrate. U.S. Pat. No. 6,753,362 described a cold bond adhesive composition that produces a strong bond between a polymeric capping membrane used in a roofing application and a roofing substrate. This composition is comprised of a homogeneous 60 to 75% solids mixture of (a) between about 0.5 weight percent and about 15 weight percent of a thermosetting styrene/isoprene/styrene block polymer containing up to 90% styrene; (b) between about 13 weight percent and about 30 weight percent of a aromatic hydrocarbon solvent containing from about 5 weight percent to about 20 weight percent aliphatic hydrocarbon; (c) between about 20 weight percent and about 70 weight percent a non-blown asphalt optionally containing a minor amount of blown asphalt; (d) between about 1 weight percent and about 10 weight percent of a metal silicate and (e) between about 0.1 weight percent and about 5 weight percent of a $C_6$ to $C_{16}$ alkoxyalkyl amine substituted ester of a $C_2$ to $C_{12}$ carboxylic acid as a surfactant.

In some cases self seal adhesive compositions are applied to the underside of roofing shingles and covered with a release tape at the factory where they are manufactured. This allows for the adhesive to be applied to the roofing shingles under the controlled environment of the factory which offers the advantage of consistency and reduced risk of contamination. The release tape keeps the adhesive from prematurely sticking to surfaces in an undesired manner during storage and transportation. The release tape can be removed from the underside of the roofing shingles at the site where it is being applied as a roof covering shortly before it is used. This can be done by simply pulling the release tape from the roofing shingle to expose the adhesive. Roofing shingles of this type are described by U.S. Pat. No. 6,813,866 and U.S. Pat. No. 6,895,724. The adhesive utilized in such applications is typically an asphalt composition that has been modified with a block copolymer, such as a styrene-butadiene-styrene triblock polymer, a styrene-isobutylene-styrene triblock polymer, or a styrene-ethylene-butadiene-styrene block polymer.

The utilization of block copolymers in such asphalt based adhesive compositions substantially increases cost. Polymer modified asphalts that are used in adhesive applications are also susceptible to phase separation which in turn can lead to instability over time. Accordingly, a lower cost self seal adhesive that does not phase separate and which possesses the characteristics needed for adhering asphalt based roofing shingles to roof structures is in demand.

SUMMARY OF THE INVENTION

This invention is based upon the discovery that the solvent extracted aromatic cut of heavy vacuum gas oil can be oxidized to produce an adhesive composition that has all the needed attributes of a self seal adhesive for asphalt roofing shingles. This self seal adhesive composition offers numerous benefits and advantages over conventional self seal adhesives for roofing applications. For instance, it does not require any volatile organic solvents and is accordingly environmentally friendly. The self seal adhesive composition of this invention does not contain any asphalt or polymers and will not phase separate. Thus, it offers excellent long term stability. Additionally, the self seal adhesive composition of this invention is made by the simple oxidation of the solvent extracted aromatic cut of heavy vacuum gas oil and is accordingly relatively inexpensive.

The present invention more specifically discloses an oxidized aromatic viscoelastic resin wherein said resin is comprised of an oxidized solvent extracted aromatic cut of heavy vacuum gas oil.

The subject invention also reveals a self seal adhesive composition made by a process which comprises oxidizing a solvent extracted aromatic cut of heavy vacuum gas oil. The oxidation is typically done by air blowing at a temperature which is within the range of 400° F. (204° C.) to 550° F. (288° C.). The air blowing is normally conducted until the oxidized solvent extracted aromatic cut of heavy vacuum gas oil has a softening point which is within the range of 170° F. (77° C.) to 250° F. (121° C.). The air blowing will preferably be conducted until a softening point within the range of 170° F. (77° C.) to 200° F. (93° C.) is attained.

The present invention further discloses an asphaltic roofing shingle which is comprised of a back surface and an exposure surface, wherein the asphaltic roofing shingle has a self seal adhesive on the back surface or the exposure surface, and wherein the self seal adhesive is comprised of an oxidized solvent extracted aromatic cut of heavy vacuum gas oil. The self adhesive is typically on the back surface of the roofing shingle and the self seal adhesive is generally covered with a release tape to facilitate storage and transportation of the roofing shingles.

DETAILED DESCRIPTION OF THE INVENTION

The first step in refining crude oil typically involves distilling it under atmospheric pressure. This atmospheric distillation step typically separates the light hydrocarbon constituents of the crude oil stream having boiling points of below about 400° C. (204° C.) from the heavy hydrocarbon constituents that have boiling points of higher than about 400° C. (204° C.). The light hydrocarbon streams recovered from the atmospheric distillation step normally include (1) $C_1$ to $C_4$ hydrocarbon gases, such as methane, ethane, ethylene, propane, butane, 1-butene, 1,3-butadiene, and similar gases, (2) light straight run gasoline, (3) heavy straight run naphtha, (4) kerosene, and (5) light atmospheric gas oil. The heavy hydrocarbon constituents that remain are known as the atmospheric distillation unit bottoms. These distillation unit bottoms are then subjected to a vacuum distillation step which separates this mixture of heavy hydrocarbons into a light vacuum gas oil stream, a heavy vacuum gas oil stream, asphalts, and vacuum distillation residue.

The heavy vacuum gas oil is a complex mixture of hydrocarbons that typically contain from about 25 carbon atoms to about 45 carbon atoms and which has a boiling point within the range of about 650° F. (343° C.) to about 1050° F. (566° C.). The heavy vacuum gas oil is characterized by containing less than about 0.3 weight percent asphaltenes. The heavy vacuum gas oil will typically contain less than 0.2 weight percent asphaltenes and will more typically contain less than 0.1 weight percent asphaltenes. However, the heavy vacuum gas oil should be distinguished from the stream of heavy material which is removed near the bottom of the vacuum gas column which is referred to as slop wax. The heavy vacuum gas oil contains both an aromatic component and an aliphatic component. The aromatic component can be separated from the aliphatic component by solvent extraction.

The aromatic cut recovered by solvent extraction of the heavy vacuum gas oil stream is an opaque resinous material that is used commercially as a viscosity builder for metal working applications. This solvent extracted aromatic cut of heavy vacuum gas oil typically has a flash point which is within the range of about 590° F. (310° C.) to about 650° F. (343° C.) and is identified by C.A.S. No. 8052-42-4. It is available commercially from The American Refining Group, Inc. as Kendex® 0897 resin.

In making the self seal adhesive composition of this invention the solvent extracted aromatic cut of heavy vacuum gas oil is oxidized by exposing it to an oxygen containing environment at an elevated temperature. This can be accomplished by utilizing an air blowing procedure. In such an air blowing technique the solvent extracted aromatic cut of heavy vacuum gas oil is heated to a temperature which is within the range of 400° F. (204° C.) to 550° F. (288° C.) and an oxygen containing gas is blown through it. This air blowing step will preferably be conducted at a temperature which is within the range of 425° F. (218° C.) to 525° F. (274° C.) and will most preferably be conducted at a temperature which is within the range of 450° F. (232° C.) to 500° F. (260° C.). This air blowing step will typically take about 4 hours to about 12 hours and will more typically take about 8 hours to about 10 hours. However, the air blowing step will be conducted for a period of time that is sufficient to attain a softening point within the range of 170° F. (77° C.) to 250° F. (121° C.). The solvent extracted aromatic cut of heavy vacuum gas oil will typically be air blown until a softening point within the range of 170° F. (77° C.) to 200° F. (93° C.) is attained. The oxidized solvent extracted aromatic cut of heavy vacuum gas oil is at least 95% soluble in normal-heptane and is preferably at least 98% soluble in normal-heptane. The oxidized solvent extracted aromatic cut of heavy vacuum gas oil also exhibits ultraviolet fluorescence. Furthermore, the oxidized solvent extracted aromatic cut of heavy vacuum gas oil contains carbonyl functionality, such as ketone moieties.

The oxygen containing gas (oxidizing gas) is typically air. The air can contain moisture and can optionally be enriched to contain a higher level of oxygen. Chlorine enriched air or pure oxygen can also be utilized in the air blowing step. Oxidation can be performed either with or without a conventional air blowing catalyst.

The oxidized solvent extracted aromatic cut of heavy vacuum gas oil can optionally be blended with about 5 weight percent to about 40 weight percent of a filler in making the self seal adhesive composition. The filler will typically be employed at a level which is within the range of 10 weight percent to 30 weight percent. The filler will typically be a mineral filler, such as limestone, clay, talc, fly ash, volcanic ash, graphite, carbon black, silica, or a mixture of such mineral fillers. Polymeric fillers, such as polyisobutylene, can also be used. However, the self seal adhesive compositions of this invention will normally be void of polymeric materials, such as block copolymers. Accordingly, the self seal adhesive composition will typically be void of styrene-butadiene-styrene triblock polymers. It is also typically void of rubber cements, such as solutions of styrene-butadiene rubber. The adhesive compositions of this invention will also be typically of free of ethylene-vinyl acetate, modified acrylics, and organic solvents.

The self seal adhesive compositions of this invention can be applied to asphalt roofing shingles in the conventional manner. The self seal adhesive can either be applied to the exposure surface of the roofing shingle or to the back of the shingles. The adhesive will typically be applied to the back of the roofing shingles which will allow the shingles to adhere directly to a wooden roofing surface, a roofing underlayment, or a roof deck that already has a roofing material installed on it. In other words, the self seal adhesive of this invention will form a strong bond to wood, roofing underlayment materials, and the exposure surface of preexisting roofs. Accordingly, it can be used in new construction or in the installation of a new roof over a previously installed roofing material.

The self seal adhesive composition will typically be applied to the roofing shingles as part of the process used in manufacturing them. In such cases, the adhesive on the roofing shingles will be covered with a release tape so that the roofing shingles do not have any areas of exposed adhesive on their surface. Covering the adhesive with release tape makes it feasible to store and transport the roofing shingles through chains of distribution and ultimately to the site of application. The release tape is normally a polymeric film of a polyester or a polyolefin, such as polyethylene or polypropylene, which is treated with a silicon compound on the side that will be in contact with the adhesive. The release tape is typically from about 20 to about 100 microns thick and is preferably from 40 to 80 microns thick. The silicon compound prevents the adhesive from forming a strong bond to the release tape and allows for the release tape to be removed before the roofing shingle is applied to the desired surface.

The self seal adhesives of this invention can be used in conjunction with virtually any type of asphalt roofing shingles. For instance, the self seal adhesives of this invention can be used as a direct replacement for the self seal adhesives that are used in manufacturing self seal roofing shingles that are known in the art using known techniques. Such roofing shingles are described in detail in U.S. Pat. No. 6,696,125, U.S. Pat. No. 6,813,866 and U.S. Pat. No. 6,895,724. The teachings of U.S. Pat. No. 6,696,125, U.S. Pat. No. 6,813,866 and U.S. Pat. No. 6,895,724 are incorporated herein by reference with respect to describing the types of shingles that can be used in conjunction with the self seal adhesives of this invention and techniques that can be used to manufacture such shingles.

This invention is illustrated by the following examples that are merely for the purpose of illustration and are not to be regarded as limiting the scope of the invention or the manner in which it can be practiced. Unless specifically indicated otherwise, parts and percentages are given by weight.

Example

In this experiment a solvent extracted aromatic cut of heavy vacuum gas oil was oxidized by air blowing. The solvent extracted aromatic cut of heavy vacuum gas oil used was Kendex® 0897 resin (C.A.S. 8082-42-4). It was characterized by having a viscosity at 100° C. of about 47.5 cSt, a flash point of about 590° F. (310° C.), and a pour point of about 9° C.

In the procedure used, the solvent extracted aromatic cut of heavy vacuum gas oil was heated to a temperature of 500° C. and air was blown through it for about 9 hours while it was maintained at the temperature of 500° C. The air being blown through the solvent extracted aromatic cut of heavy vacuum gas oil provided sufficient agitation and additional mixing or stirring was not required. Over the 9 hour period the softening point of the solvent extracted aromatic cut of heavy vacuum gas oil increased as it oxidized until it reached a final softening point of 205° C.

The oxidized solvent extracted aromatic cut of heavy vacuum gas oil produced exhibited excellent adhesion to wood and to asphalt roofing shingles. It can be applied to the back of asphalt roofing shingles and covered with release tape. These shingles can then be applied to wooden roofs or over the top preexisting roofing shingles. In either case the self seal adhesive meets all of the physical and chemical requirements needed in such applications.

While certain representative embodiments and details have been shown for the purpose of illustrating the subject invention, it will be apparent to those skilled in this art that various changes and modifications can be made therein without departing from the scope of the subject invention.

What is claimed is:

1. An asphaltic roofing shingle which is comprised of a back surface and an exposure surface, wherein the asphaltic roofing shingle has a self seal adhesive on the back surface or the exposure surface, and wherein the self seal adhesive is comprised of an oxidized solvent extracted aromatic cut of heavy vacuum gas oil, and wherein the oxidized solvent extracted aromatic cut from the heavy vacuum gas oil is at least 95% soluble in normal-heptane, wherein the solvent extracted aromatic cut of heavy vacuum, gas oil is essentially free of an aliphatic component.

2. An asphaltic roofing shingle as specified in claim 1 wherein the self adhesive is on the back surface of the roofing shingle, and wherein the self seal adhesive is covered with a release tape.

3. An asphaltic roofing shingle as specified in claim 1 wherein the oxidized solvent extracted aromatic cut from the heavy vacuum gas oil has a softening point which is within the range of 170° F. to 250° F.

4. An asphaltic roofing shingle as specified in claim 3 wherein the oxidized solvent extracted aromatic cut of heavy vacuum gas oil is at least 98% soluble in normal-heptane.

5. An asphaltic roofing shingle as specified in claim 3 wherein the oxidized solvent extracted aromatic cut of heavy vacuum gas oil exhibits ultraviolet fluorescence.

6. An asphaltic roofing shingle as specified in claim 3 wherein the oxidized solvent extracted aromatic cut of heavy vacuum gas oil contains carbonyl functionality.

7. An asphaltic roofing shingle as specified in claim 6 wherein the carbonyl functionality includes ketone moieties.

8. An asphaltic roofing shingle as specified in claim 1 wherein the oxidized solvent extracted aromatic cut of heavy vacuum gas oil is further comprised of a mineral filler.

9. An asphaltic roofing shingle as specified in claim 8 wherein the mineral filler is present at a level which is within the range of about 5 weight percent to about 40 weight percent.

10. An asphaltic roofing shingle as specified in claim 9 wherein the mineral filler is limestone.

11. An asphaltic roofing shingle as specified in claim 9 wherein the mineral filler is clay.

12. An asphaltic roofing shingle as specified in claim 9 wherein the mineral filler is talc.

13. An asphaltic roofing shingle as specified in claim 9 wherein the mineral filler is fly ash.

14. An asphaltic roofing shingle as specified in claim 9 wherein the mineral filler is volcanic ash.

15. An asphaltic roofing shingle as specified in claim 9 wherein the mineral filler is carbon black.

16. An asphaltic roofing shingle as specified in claim 9 wherein the mineral filler is graphite.

17. An asphaltic roofing shingle as specified in claim 9 wherein the mineral filler is carbon black.

18. An asphaltic roofing shingle as specified in claim 8 wherein the mineral filler is present at a level which is within the range of 10 weight percent to about 30 weight percent.

19. An asphaltic roofing shingle as specified in claim 1 wherein the solvent extracted aromatic cut of heavy vacuum gas oil is oxidized by air blowing, wherein the air blowing is conducted at a temperature which is within the range of 400° F. to 550° F.

20. An asphaltic roofing shingle as specified in claim 19 wherein the air blowing is conducted until the oxidized solvent extracted aromatic cut from the heavy vacuum gas oil has a softening point which is within the range of 170° F. to 250° F.

* * * * *